(12) United States Patent
Agrawal et al.

(10) Patent No.: US 8,980,799 B2
(45) Date of Patent: Mar. 17, 2015

(54) POLYMER FOAM CELL MORPHOLOGY CONTROL AND USE IN BOREHOLE FILTRATION DEVICES

(75) Inventors: Gaurav Agrawal, Aurora, CO (US); Ping Duan, Cypress, TX (US)

(73) Assignee: Baker Hughes Incorporated, Houston, TX (US)

( * ) Notice: Subject to any disclaimer, the term of this patent is extended or adjusted under 35 U.S.C. 154(b) by 840 days.

(21) Appl. No.: 12/883,656

(22) Filed: Sep. 16, 2010

(65) Prior Publication Data
US 2012/0067587 A1 Mar. 22, 2012

(51) Int. Cl.
*C08J 9/36* (2006.01)
*E21B 43/02* (2006.01)
*C08J 9/38* (2006.01)

(52) U.S. Cl.
CPC . *E21B 43/02* (2013.01); *C08J 9/36* (2013.01); *C08J 9/38* (2013.01); *C08J 2375/04* (2013.01)
USPC .............. 507/219; 507/221; 166/309; 521/77

(58) Field of Classification Search
None
See application file for complete search history.

(56) References Cited

U.S. PATENT DOCUMENTS

| | | | |
|---|---|---|---|
| 3,986,781 A * | 10/1976 | Condo et al. ................ | 404/31 |
| 4,525,103 A * | 6/1985 | Meyer et al. ............... | 405/259.6 |
| 5,059,632 A * | 10/1991 | Horn et al. .................. | 521/137 |
| 5,910,357 A | 6/1999 | Hachisuka et al. | |
| 6,043,290 A | 3/2000 | Petrella | |
| 7,048,048 B2 | 5/2006 | Nguyen et al. | |
| 7,708,073 B2 | 5/2010 | Richard et al. | |
| 7,743,835 B2 | 6/2010 | Willauer | |
| 7,926,565 B2 * | 4/2011 | Duan et al. .................. | 166/278 |
| 2007/0240877 A1 | 10/2007 | O'Malley et al. | |
| 2009/0084539 A1 | 4/2009 | Duan et al. | |
| 2010/0089565 A1 | 4/2010 | Duan et al. | |

OTHER PUBLICATIONS

International Search Report, PCTUS2011/047005, issued Dec. 27, 2011, 3 pages.
Written Opinion of the International Searching Authority, PCT/US2011/047005, issued Dec. 27, 2011, 3 pages.
Marc Behl and Andreas Lendlein, "Shape-memory polymers", materialstoday, Apr. 2007, vol. 10, No. 4.
Elaine M. Kirkpatrick, Witold Sokolowski, "Heating Methods for Deployment of CHEM Foam Structures", SAE International 2003.
M.A. Di Prima et al. "Thermo-mechanical behavior or epoxy shape memory polymer foams", Smart Materials and Strucutres, 16 (2007) pp. 2330-2340.
Yang et al. "On the Effects of Moisture in a Polyurethane Shape Memory Polymer", Smart Materials and Structures, 13 (2004) 191-195.

* cited by examiner

*Primary Examiner* — John J Figueroa
(74) *Attorney, Agent, or Firm* — Cantor Colburn LLP

(57) ABSTRACT

A method of deploying a borehole filtration device is provided utilizing the steps of:
deploying a filtration device comprising a polymer foam having a first cell structure, a portion of the molecular structure of which polymer foam is degradable by exposure to a post-treatment fluid, into a borehole; and
exposing the polymer foam to the post-treatment fluid, thereby modifying the cell structure of the polymer foam to a second cell structure.

10 Claims, 1 Drawing Sheet

POLYMER FOAM CELL MORPHOLOGY CONTROL AND USE IN BOREHOLE FILTRATION DEVICES

BACKGROUND

Sand control is a well known discipline in downhole drilling and completion industries. Those of skill in the art are well versed in the various methodologies and systems available for gravel packs. Those skilled are also cognizant of the time and cost associated with gravel packs and the potentials for and modes of gravel pack failure. In view of such conditions, many alternatives have been used over the years; however, new and different alternatives are always well received that might be more appropriate for or function better in certain environments or could be less costly or more durable.

SUMMARY

In one exemplary embodiment of the invention, a method of deploying a borehole filtration device is provided utilizing the steps of:

deploying a filtration device comprising a polymer foam having a first cell structure into a borehole, a portion of the molecular structure of which polymer foam is degradable by exposure to a post-treatment fluid; and exposing the polymer foam to the post-treatment fluid, thereby modifying the cell structure of the polymer foam to a second cell structure.

In another exemplary embodiment, a method of preparing a polymer foam is provided including:

reacting a first component comprising a first monomer compound with a second component comprising second and third monomer compounds that are each reactive with first monomer compound, the second monomer compound being resistant to degradation by a post-treatment fluid and the third monomer compound being susceptible to degradation by the post-treatment fluid; and contacting the polymer foam with the post-treatment fluid.

In yet another exemplary embodiment, a polyurethane foam is provided that is the reaction product of a first component comprising a polyisocyanate and a second component comprising a first polyol that is a polycarbonate polyol and a second polyol that is a polyester polyol or a polyether polyol.

BRIEF DESCRIPTION OF THE DRAWINGS

Referring now to the drawings wherein like elements are numbered alike in the several Figures.

DETAILED DESCRIPTION

Figure 1:
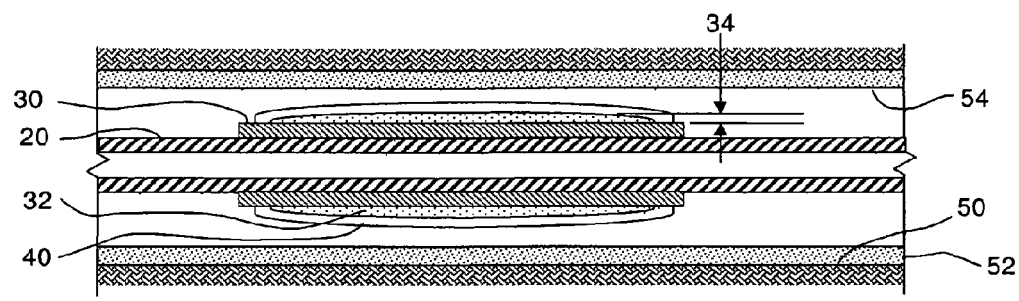
FIG. 1 is a schematic, cross-section view of a filtration device which bears a shape-memory porous material in its compressed, run-in thickness or volume, having thereover a degradable delaying film, covering or coating material.

Some exemplary embodiments of the invention may include any application where post-treatment of a polymer foam may be used to modify the foam's cell morphology. In one exemplary embodiment, a polymer foam is used in a downhole borehole filtration device. The practice of the present invention is not limited to any particular configuration of downhole filtration device. In one exemplary embodiment, an expandable shape memory polymer foam is used in order to provide a filter medium that substantially conforms to the shape of the borehole; however, the use of such an expandable polymer foam is not required in order to practice exemplary embodiments of the invention of altering the cell morphology of the foam after it has been deployed into the borehole. An exemplary shape memory polymer foam is described in the above-mentioned U.S. Pat. Appl. Publ. No. 2010/0089565 A1, the disclosure of which is incorporated herein by reference in its entirety. As discussed above, this foam is capable of expanding from an altered compressed shape toward an original uncompressed shape when heated to a temperature sufficient to cause expansion. The specific temperature sufficient to cause expansion will vary depending on a number of conditions, including but not limited to the level of compression and consequent re-expansion desired; however, the temperature will generally be below, but near the glass transition temperature, $T_g$.

The glass transition temperature may nominally be considered as a temperature at which a polymer transitions from a hard glass state to a soft, elastomeric state as portions of the polymer molecules become more mobile due to the increase in their energy levels brought about absorption of heat energy, but it may be more appropriately considered as a temperature range over which such a transition occurs, with a nominal $T_g$ somewhere in the range. The temperature at which the transition begins may be referred to as "transition onset". One well-known technique for measuring glass transition temperature is Dynamic Mechanical Analysis (DMA), in which the storage modulus and loss modulus of a polymer are measured as a response to small amounts of deformation applied in a cyclic fashion. Using this technique, the nominal $T_g$ may be determined in an exemplary embodiment by observing a sharp peak in a plot of the loss modulus versus temperature. Transition onset may be determined in an exemplary embodiment by observing a pronounced steepening of the negative slope of a plot of storage modulus versus temperature. In an exemplary embodiment for a downhole filtration device, the foam has a glass transition onset temperature that is above the temperature at the downhole application location, and is sufficient to prevent the foam from prematurely expanding while it is being transported down the borehole while allowing for re-expansion after it reaches the downhole location.

In an exemplary embodiment where the above-described shape memory foam is used for a downhole filtration device, prior to downhole deployment the polymer foam is compressed to a compressed shape at a temperature above the glass transition temperature and then cooled to a temperature below the glass temperature while maintaining the compressed shape. The compressed foam may be wrapped in a dissolvable film such as a polyvinyl alcohol film in order to prevent premature expansion of the foam in case it is exposed to elevated temperatures while being run down the borehole before reaching the downhole deployment location. After the foam-containing filtration device reaches the downhole deployment location, the dissolvable film can be dissolved with water, and the foam is heated (either from ambient heat in the borehole or by applying heat such as from a heater) to expand the foam. The foam can be treated with the post-treatment fluid to modify its cellular structure at any point in the process, depending on the desired effect. In one exemplary embodiment, the foam is treated with the post-treatment fluid before it is compressed to a compressed shape. In another exemplary embodiment, the foam is treated with the post-treatment fluid after downhole deployment. In such an exemplary embodiment, post-treatment fluid can either be injected into the borehole or it can be water, oil, or a water-oil mixture already present in the borehole, and may be used to treat the foam either before, during, or after expansion of the foam.

Figure 2:
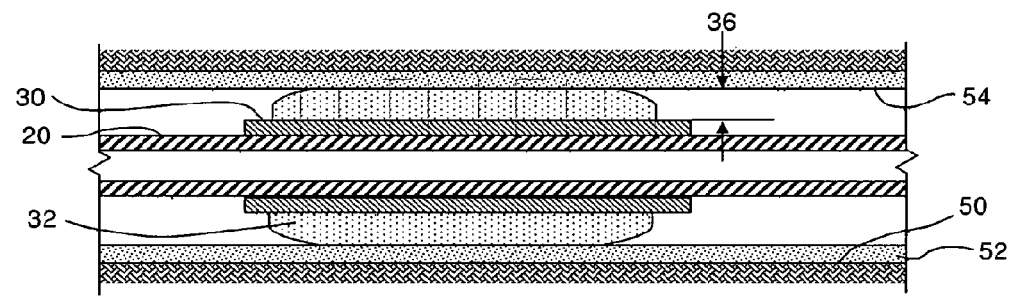
FIG. 2 is a schematic, cross-section view of the filtration device of FIG. 1 where the degradable delaying film, covering or coating material has been removed and the shape-memory porous material has been permitted to expand or deploy so that it firmly engages and fits to the inner wall surface of the well-bore casing to prevent the production of undesirable solids from the formation, allowing only hydrocarbon fluids to flow therethrough.

The operation of one exemplary configuration utilizing a shape memory polymer foam is described with reference to FIGS. 1 and 2, where tubing string 20 having filtration device 30 including a shape-memory porous material 32 is run-in borehole 50, which is defined by borehole casing 52, to the desired location. As shown in FIG. 1, shape-memory polymer foam 32 has a compressed, run-in, thickness 34, and an outside delay film, covering or coating 40. After a sufficient amount of delaying film, covering or coating material 40 is dissolved or de-composed, i.e., after the delaying film, covering or coating material 40 is dissolved or decomposed such that the stored energy in the compressed shape-memory material 32 is greater than the compressive forces provided by the delaying material, shape-memory porous material 32 expands from the run-in or compressed position (FIG. 1) to the expanded or set position (FIG. 2) having an expanded thickness 36. In so doing, shape-memory material 32 engages with inner wall surface 54 of borehole casing 52, and, thus, prevents the production of undesirable solids from the formation, allows only hydrocarbon fluids flow through the filtration device 30.

The polymer foam used in the invention may made with any type of polymer out of which a polymer foam can be prepared, such as polyurethane, epoxy polymer, acrylic polymer, polyimide, poly ether ketone, and others as are known in the art. The specific polymer to be used and the chemical makeup thereof will depend on the particular configuration and design parameters of the filtration device or other application for which the foam will be used, as well as on the particular post-treatment fluid that will be used, and the temperature at which and the duration the polymer foam will be exposed to the post-treatment fluid. Exemplary post-treatment fluids include water, acids, bases, polar organic solvents, non-polar organic solvents (including crude oil), and combinations thereof. In one exemplary embodiment, the polymer foam is a reaction product of two components where one of the components includes a first monomer compound, and the other component includes second and third monomer compounds that are each reactive with the first monomer compound, where the second monomer compound is resistant to degradation by the post-treatment fluid and the third monomer compound is susceptible to degradation by the post-treatment fluid.

In an exemplary embodiment, the polymer foam is a polyurethane foam that is the reaction product of a component that includes one or more polyisocyanates with a component that includes one or more polyols. The polyisocyanate may be one or more of any of a number of polyisocyanates as are well-known for applications in the production of polyurethane foams. Exemplary polyisocyanates include, but are not limited to aromatic polyisocyanates, such as MDI (e.g., 4,4'-MDI, blends of 4,4'-MDI and 2,4'-MDI, MDI prepolymer, and modified polymeric MDI containing monomeric MDI), toluene diisocyanate (TDI), p-phenylene diisocyanate (PPDI), naphthalene diisocyanate (NDI), and o-tolidine diisocyanate (TODI), as well as aliphatic polyisocyanates such as 1,6-hexamethylene diisocyanate (HDI), isophorone diisocyanate (IPDI), tetramethylxylene diisocyanate (TMXDI), and cyclohexane diisocyanate (CHDI). Mixtures of any of the aforementioned polyisocyanates or other known polyisocyanates may also be used. In one exemplary embodiment, the polyisocyanate is a modified MDI (e.g., MONDUR PC sold by Bayer) or MDI prepolymer (e.g., LUPRANATE 5040 sold by BASF).

The polyol may be one or more of any of a number of polyols as are well-known for applications in the production of polyurethane foams. Exemplary polyols include, but are not limited to polyether polyols (e.g., prepared by reaction of ethylene oxide and/or propylene oxide with polyol initiators such as propylene glycol, glycerine, toluene diamine, sorbitol, or sucrose, to name a few), polyester polyols (e.g., prepared by polyesterification of low molecular weight polyacids such as malonic acid, succinic acid, adipic acid, carballylic acid with low molecular weight polyols such as propylene glycol, 1,4-butane diol, and the like, and also polycaprolactone polyols), polycarbonate polyols, polybutadiene polyols, and the like.

In an exemplary embodiment where the foam is used in a downhole borehole filtration device, the foam is prepared with a polyol that includes a polycarbonate polyol. In a further exemplary embodiment, the polycarbonate polyol may have a molecular weight ranging from 1000 to 2000 and an OH number ranging from 50 to 130. In yet another exemplary embodiment, the polycarbonate polyol is an aliphatic polycarbonate polyol, a cycloaliphatic polycarbonate polyol, or a mixture thereof. Exemplary polycarbonate polyols include, but are not limited to DESMOPHEN C1200 and DESMOPHEN 2200 from Bayer, Poly-CD 220 from Arch Chemicals, PC-1733, PC-1667 and PC-1122 from Stahl USA. In one non-limiting embodiment, the polycarbonate polyol is PC-1667 or poly(cycloaliphatic carbonate). Polyurethane foams used in downhole borehole applications may be formulated to achieve $T_g$'s ranging from 60° C. to 170° C.

In certain embodiments, the relative amounts of polyisocyanate and polyol in a polyurethane reaction mixture may provide a molar ratio of about 1:1, but the molar ratio of polyisocyanate to polyol may vary from 0.90:1 to 1.1:0.9. Polyurethane foams generally require a blowing agent to produce the foam cell structure. Water is commonly used as a blowing agent, which functions by reacting with isocyanate groups on the polyisocyanate to form $CO_2$. Gaseous blowing agents may also be used, such as HFA's (e.g., R-134a, R-245a), HFO's (e.g., R-1234ze), or aliphatic hydrocarbons (e.g., propane). The choice and amount of blowing agent, along with other components such as reactants and catalysts, will impact the foam's cell pore size, cell size distribution, and cell openness, and the various components and reaction conditions may be readily adjusted by one skilled in the art in order to produce the desired foam cell morphology.

Polyurethane foams reaction mixtures may also include small amounts of chain-extenders (low molecular weight diols or diamines) such as ethylene glycol, propylene glycol, ethanolamine, or diethyltoluenediamine, or dimethylthiotoluenediamine (DMTDA). Other suitable chain extenders include but are not limited to 4,4'-Methylene bis(2-chloroaniline), "MOCA", sold by Chemtura under the commercial name VIBRA-CURE® A 133 HS, and trimethylene glycol di-p-aminobenzoate, "MCDEA", sold by Air Products under the commercial name VERSALINK 740M. The reaction mixture may also include cross-linkers (low molecular weight polyfunctional alcohols or amines) such as trimethylol propane (TMP), triethanolamine (TEA), or N,N,N',N'-tetrakis(2-hydroxypropyl)ethylenediamine. Catalysts, such as amine catalysts (e.g., tertiary amines such as triethylenediamine), organometallic catalysts, trimerization catalysts (e.g., 1,3,5-(tris(3-dimethylamino)propyl)-hexahydro-s-triazine) may also be included in the reaction mixture.

Other additives such as surfactants, flame retardants, stabilizers, and others as known in the art, may be used in the foam formulation depending on the specifications for the end-use application. Fore example, a conventional amount of surfactant, e.g., 0.5% of total weight, such as the surfactant sold under the commercial name DABCO DC-198 by Air Products and a small amount of cell opener, e.g., 0.5% of total weight, such as the cell opener sold under the commercial names ORTEGOL 500, ORTEGOL 501, TEGOSTAB B8935, TEGOSTAB B8871, and TEGOSTAB B8934 by Degussa may be added into the formulations to control foam cell structure, distribution and openness. DABCO DC-198 is a silicone-based surfactant from Air Products. Other suitable surfactants include, but are not necessarily limited to, fluorosurfactants sold by DuPont under commercial names ZONYL 8857A and ZONYL FSO-100. Colorant may be added in the polyol portion to provide desired color in the finished products. Such colorants are commercially available from companies such as Milliken Chemical which sells suitable colorants under the commercial name REACTINT In the practice of exemplary embodiments of the invention, a polymer foam is contacted with a post-treatment fluid to modify its cell morphology. In some exemplary embodiments, a polymer foam can be adapted for such post treatment by including bonds or molecular segments in its molecular structure that are susceptible to degradation by the post-treatment fluid. The precise structures involved will of course depend on the nature of the post-treatment fluid and conditions. In one exemplary embodiment, the molecular structure of the polymer foam includes ester linkages, which can be subjected to hydrolysis by water, which may be further facilitated by the presence a strong base to provide hydroxyl ions for nucleophilic attack on the ester linkage, or by the presence of an acid to protonate the ester carbonyl group and make it more susceptible to nucleophilic attack. Ester linkages may be included in a crosslinking agent or in the polymer backbone. In one exemplary embodiment where the polymer foam is a polyurethane foam, ester linkages are incorporated by including a polyester polyol in the reaction mixture. In a further exemplary embodiment, a polyester polyol in a polyurethane reaction mixture may have a molecular weight of from 1000 to 2000 and an OH number of from 50 to 130. The amount of polyester polyol in a polyurethane composition may vary widely depending on the desired level of modification to the foam cell structure. In an exemplary embodiment where a polyurethane foam is integrated into a downhole borehole device, the polyester polyol component may comprise from 80 to 95 weight percent polycarbonate polyol and from 20 to 5 weight percent polyester polyol. In another exemplary embodiment, polymer foam includes polyether polyol or polyester polyol segments that are susceptible to degradation by exposure to high-temperature fluids as may be experienced in a borehole. Exemplary thermal degradable polyether polyols include, but are not limited to Poly-G 21-77, Poly-G 21-90, Poly-G 21-112 and Poly-G 21-187 from Arch Chemicals. Exemplary thermal degradable polyester polyols include, but are not limited to Fomrez 45, Fomrez 1023-63, Fomrez 1066-187, and Fomrez 1066-560 from Chemtura.

In one exemplary embodiment, the mixture containing the isocyanate portion and the polyol portion may be mixed for about 10 seconds and then poured into a mold and the mold immediately closed by placing a top metal plate thereon. Due to pressure generated by water-induced foaming process, a C-clamp may be used to hold the top metal plate and mold together to prevent any leakage of mixture. After approximately 2 hours at room temperature, the polyurethane foam material including a mold and a C-clamp may be placed inside an oven and "post-cured" at a temperature of 110° C. for approximately 8 hours so that the polyurethane foam material reaches its full strength. After being cooled down to room temperature, the polyurethane foam material is sufficiently cured such that the mold may be removed. Thereafter, the polyurethane foam material at this stage will typically include a layer of "skin" on the outside surface of the polyurethane foam. The "skin" is a layer of solid polyurethane plastic formed when the mixture contacts with the mold surface. It has been found that the thickness of the skin depends on the concentration of water added to the mixture. Excess water content decreases the thickness of the skin and insufficient water content increases the thickness of the skin. In one non-limiting explanation, the formation of the skin may be due to the reaction between the isocyanate in the mixture and the moisture on the mold surface. In such a case, additional mechanic conversion processes are needed to remove the skin if the foam will be used as a filter element, since in most cases the skin is not porous to the passage of fluids therethrough. Tools such as band saws, miter saws, core saws, hack saws and lathes may be used to remove the skin.

Preparations

In one embodiment, two types of polyols, one being a thermal stable polyol such as a polycarbonate polyol and the other being a thermal degradable polyols such as a polyester polyol, are blended together. The ratio of these two polyols is about 90% by weight for thermal stable polycarbonate polyol and 10% by weight for thermal degradable polyester polyol. Other components such as TMP cross-linker, DMTDA chain extender, DABCO DC-198 surfactant, ORTEGOL 501 cell opener, REACTINT Violet X80LT colorant, POLYCAT 77 catalyst, and water blowing agent are added to form the polyol portion. The polyol portion is preheated to 90° C. and mixed in a KITCHENAID® type single blade mixer with MDI MONDUR PC. As will be recognized by persons of ordinary skill in the art, these formulations can be scaled up to form larger volumes of this shape memory material.

In another embodiment, a polyol portion consists of 31.6 g Polycarbonate polyol PC 1667, 3.5 g Polyester Fomrez 45, 5 g cross linker TMP, 5 g chain extender, 0.8 g surfactant DABCO DC-198, 0.4 g cell opener ORTEGOL 501, 0.1 g colorant REACTINT Violet X80LT, 0.1 g catalyst POLYCAT 77, and 0.7 g blowing agent water. The polyol portion is preheated to 90° C. and mixed in a KITCHENAID® type single blade mixer with 52.7 g MDI MONDUR PC. The mixture containing the isocyanate portion and the polyol portion may be mixed for about 10 seconds and then poured into a mold and the mold immediately closed by placing a top metal plate thereon. Due to the significant amount of pressure generated by foaming process, a C-clamp or other device may be used to hold the top metal plate and mold together to prevent any leakage of mixture. After approximately 2 hours, the polyurethane foam material including a mold and a C-clamp may be transferred into an oven and "post-cured" at a temperature of 110° C. for approximately 8 hours so that the polyurethane foam material reaches its full strength. After cooling to room temperature, the polyurethane foam material is sufficiently cured such that the mold can be removed. Foam material is then cut to remove outside "skin" by tools such as bandsaw, and further treated in the hot water about 150° C. in the pressurized steel container for 10 hours. To accelerate degradation of one of the thermal-unstable polyols, acid or base may be added into water. Cell structures of polyurethane foam is observed by stereo microscope and compared to polyurethane foam without hot water treated sample. A very thin polymeric film is form between walls of cells and this thin polymeric film is found disappeared after hot water treatment process.

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A method of deploying a borehole filtration device, comprising:
    deploying a filtration device comprising a polymer foam having a first cell structure into a borehole, a portion of the molecular structure of which polymer foam is degradable by exposure to a post-treatment fluid; and
    exposing the polymer foam to the post-treatment fluid, thereby modifying the cell structure of the polymer foam to a second cell structure,
    wherein the polymer foam is a polyurethane foam, which is a reaction product of a first component compromising polyisocyanate and a second component compromising a monomer compound being resistant to degradation by the post-treatment fluid and a monomer compound being susceptible to degradation by the post-treatment fluid,
    wherein the monomer compound being resistant to degradation by the post-treatment fluid comprises polycarbonate polyol; and
    wherein the monomer compound susceptible to degradation by the post-treatment fluid comprises polyether polyol, polyester polyol, or a combination comprising at least one of the foregoing.

2. The method of claim 1, wherein the polymer foam is exposed to the post-treatment fluid before deployment into the borehole to degrade a portion of the molecular structure of the polymer foam.

3. The method of claim 1, wherein the polymer foam is exposed to the post-treatment fluid after deployment into the borehole.

4. The method of claim 3, wherein the polymer foam is a shape memory foam capable of expanding from an altered compressed shape toward an original uncompressed shape when heated near a glass transition temperature, and the method includes:
    prior to deployment into the borehole, compressing the polymer foam to a compressed shape at a temperature above the glass transition temperature and then cooling the polymer foam to a temperature below the glass temperature while maintaining the compressed shape prior; and
    after deployment into the borehole, heating the polymer foam to a temperature sufficient to expand the polymer foam.

5. The method of claim 2, wherein the polymer foam is a shape memory foam capable of expanding from an altered compressed shape toward an original uncompressed shape when heated near a glass transition temperature, and the method includes:
    prior to deployment into the borehole, exposing the polymer foam to the post-treatment fluid, then compressing the polymer foam to a compressed shape at a temperature above the glass transition temperature and then cooling the polymer foam to a temperature below the glass temperature while maintaining the compressed shape prior; and
    after deployment into the borehole, heating the polymer foam to a temperature sufficient to expand the polymer foam.

6. The method of claim 1, wherein the post-treatment fluid is selected from the group consisting of water, acids, bases, polar organic solvents, non-polar organic solvents, and combinations including at least one of the foregoing.

7. The method of claim 1, wherein modifying the cell structure comprises changing the molecular structure of the polymer foam.

8. The method of claim 1, wherein the second component comprises polycarbonate polyol and polyester polyol.

9. The method of clam 8, wherein the second component comprises 80 to 95 weight percent polycarbonate polyol and 20 to 5 weight percent of polyester polyol, based on the total weight of the second component.

10. A method of deploying a borehole filtration device, comprising:
    deploying a filtration device comprising a polymer foam having a first cell structure into a borehole, a portion of the molecular structure of which polymer foam is degradable by exposure to a post-treatment fluid; and
    exposing the polymer foam to the post-treatment fluid, thereby changing the molecular structure of the polymer foam,
    wherein the polymer foam is a polyurethane foam, which is a reaction product of a first component comprising polyisocyanate and a second component comprising a monomer compound being resistant to degradation by the post-treatment fluid and a monomer compound being susceptible to degradation by the post-treatment fluid,
    wherein the monomer compound being resistant to degradation by the post-treatment fluid comprises polycarbonate polyol;
    wherein the monomer compound being susceptible to degradation by the post-treatment fluid comprises polyether polyol, polyester polyol, or a combination comprising at least one of the foregoing; and
    wherein the second component comprises 80 to 95 weight percent polycarbonate polyol and 20 to 5 weight percent of polyester polyol, based on the total weight of the second component.

* * * * *